(12) United States Patent  (10) Patent No.: US 8,480,032 B2
Todorovic  (45) Date of Patent: Jul. 9, 2013

(54) AIRCRAFT DE-ICING DEVICE AND ENGINE NACELLE OF AN AIRCRAFT GAS TURBINE WITH DE-ICING DEVICE

(75) Inventor: Predrag Todorovic, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 286 days.

(21) Appl. No.: 12/939,609

(22) Filed: Nov. 4, 2010

(65) Prior Publication Data

US 2011/0121136 A1 May 26, 2011

(30) Foreign Application Priority Data

Nov. 26, 2009 (DE) .......................... 10 2009 055 879

(51) Int. Cl.
*B64D 15/02* (2006.01)
(52) U.S. Cl.
USPC ................... 244/134 B; 244/134 R; 244/53 B
(58) Field of Classification Search
USPC ........... 244/57, 204, 53 B, 207, 134 R, 134 B
See application file for complete search history.

(56) References Cited

U.S. PATENT DOCUMENTS

| | | | |
|---|---|---|---|
| 2,474,258 A | 6/1949 | Kroon | |
| 2,563,054 A * | 8/1951 | Messinger et al. | ........ 244/134 B |
| 2,752,111 A | 6/1956 | Schairer | |
| 3,850,691 A * | 11/1974 | Bleil et al. | ........................ 134/4 |
| 3,981,466 A * | 9/1976 | Shah | .......................... 244/134 R |
| 4,782,658 A * | 11/1988 | Perry | ............................ 60/226.1 |
| 6,427,434 B2 * | 8/2002 | Porte et al. | ................. 60/39.093 |
| 7,861,512 B2 * | 1/2011 | Olver et al. | .................. 60/226.1 |
| 8,015,788 B2 * | 9/2011 | Stephenson et al. | ........ 60/39.093 |
| 2005/0023412 A1 * | 2/2005 | Baptist et al. | .................... 244/10 |
| 2007/0220899 A1 * | 9/2007 | Earith et al. | ..................... 60/779 |
| 2008/0053100 A1 * | 3/2008 | Venkataramani et al. | ....... 60/772 |
| 2009/0165995 A1 * | 7/2009 | Bajusz et al. | .................... 165/51 |

FOREIGN PATENT DOCUMENTS

| | | |
|---|---|---|
| CA | 2509788 | 1/2006 |
| EP | 1895141 | 3/2008 |
| GB | 850691 | 10/1960 |
| GB | 1432789 | 4/1976 |
| GB | 2447228 | 9/2008 |

OTHER PUBLICATIONS

German Search Report dated Nov. 26, 2010 from counterpart German application.

* cited by examiner

*Primary Examiner* — Tien Dinh
*Assistant Examiner* — Justin Benedik
(74) *Attorney, Agent, or Firm* — Timothy J. Klima; Shuttleworth & Ingersoll, PLC

(57) ABSTRACT

An aircraft de-icing device and an engine nacelle of an aircraft gas turbine is provided with a de-icing device, with the engine nacelle 1 in the inflow area being provided with an annular air duct 2, into which heated air is introduced. At least one oil cooler 3 is arranged in the engine nacelle 1, to which engine oil is fed and which is supplied with ambient air, with the heated airflow leaving the oil cooler 3 being passed through the air duct 2.

19 Claims, 2 Drawing Sheets

Figure 1:
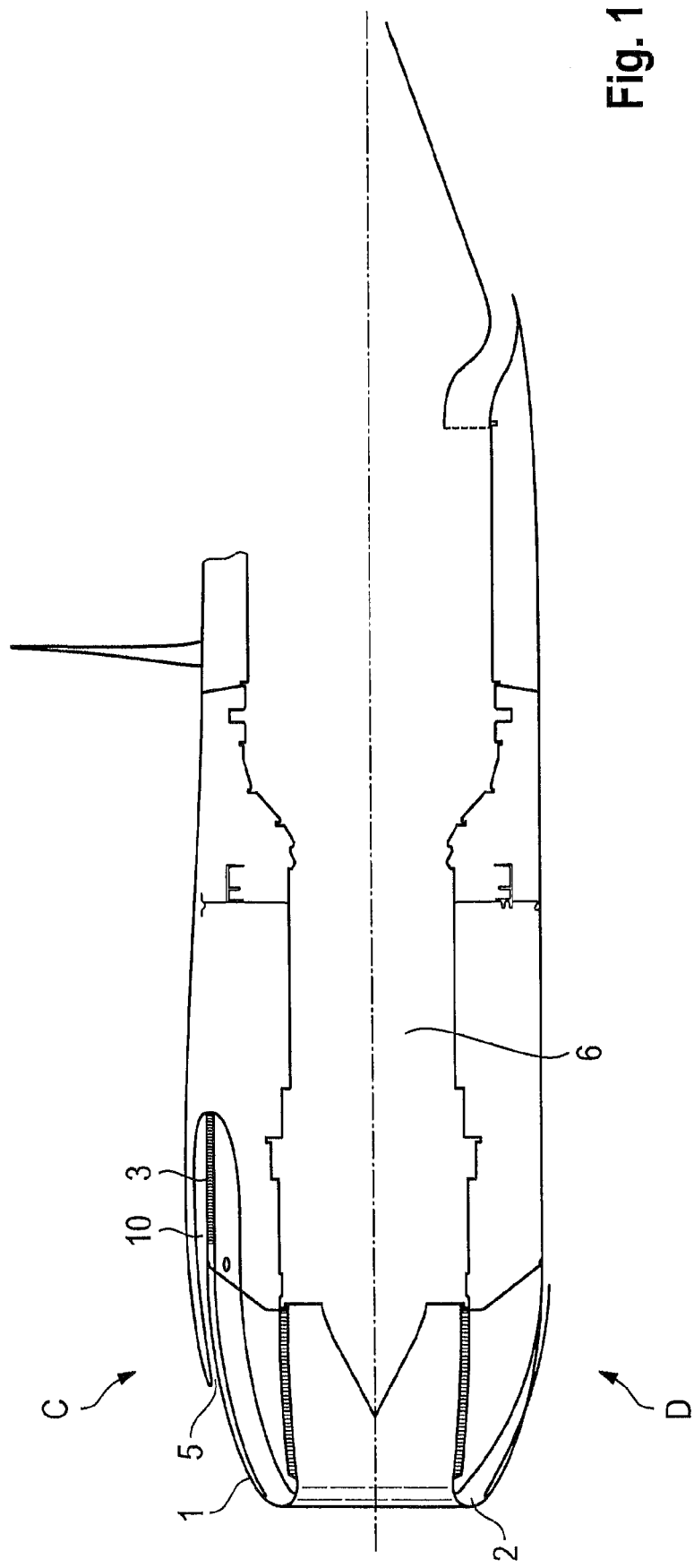

AIRCRAFT DE-ICING DEVICE AND ENGINE NACELLE OF AN AIRCRAFT GAS TURBINE WITH DE-ICING DEVICE

This application claims priority to German Patent Application DE102009055879.9 filed Nov. 26, 2009, the entirety of which is incorporated by reference herein.

This invention relates to an aircraft de-icing device and an engine nacelle of an aircraft gas turbine provided with a de-icing device.

As known from the state of the art, inlet areas of an engine nacelle must be provided with a de-icing device to ensure safe operation of an aircraft gas-turbine.

The state of the art shows solutions in which bleed air from a high-pressure compressor is fed to the inlet area of the engine nacelle. This hot air is discharged to the environment upon passing the engine nacelle, meaning a loss to the total efficiency of the aircraft gas turbine. Such a system is shown in Specification U.S. Pat. No. 3,981,466 A, for example.

A further variant known from the state of the art uses hot engine oil to heat the inlet area. Such a solution is described in Specification US 2005/023 412 A, for example.

Apart from the fact that the use of bleed air from the compressor reduces efficiency, the high temperatures of the bleed air, just as those of the engine oil, disadvantageously affect the life of the material of the inlet area of the engine nacelle.

A broad aspect of the present invention is to provide an aircraft de-icing device as well as an engine nacelle of an aircraft gas turbine with a de-icing device, which, while being simply designed and easily applicable, are highly efficient and ensure a long service life.

According to the present invention, it is therefore provided—in the case of an engine nacelle—that heated air, upon passing an oil cooler for cooling the engine oil, is fed to the inlet area of the engine nacelle, actually to an annular air duct provided in an inlet lip. This oil cooler is arranged in the area of the engine nacelle and supplied with ambient air.

The solution according to the present invention therefore enables the inlet area of the engine nacelle to be heated and icing to be avoided in a reliable manner. It accordingly obviates the need for tapping bleed air from the core engine. In consequence thereof, the efficiency of the core engine is not impaired.

The solutions for oil coolers known from the state of the art usually employ ambient air which, upon passing the oil cooler, is discharged as heated air to the environment. Therefore, with the heat removed from the engine oil not being utilizable, this air means an energetic loss.

According to the present invention, it is therefore provided that tapping of bleed air as well as wasting of the heated air leaving the oil cooler are avoided.

An engine nacelle designed according to the present invention is particularly suitable for turboprop power plants as the airflow surrounding the engine nacelle is not affected.

By designing the engine nacelle such that in its forward area it is provided with an oil cooler, the flow paths for the heated air leaving the oil cooler are minimized. It is also possible to arrange the oil cooler close to the origin of the hot oil. This provides for compactness of design of the engine nacelle according to the present invention.

A further advantage of the compact design is its insensitivity to bird strike as no additional, exposed de-icing measures are to be provided.

The airflow exiting from the oil cooler according to the present invention is moved and driven by the pressure difference between the stagnation pressure of the ambient air fed to the oil cooler and the static pressure in the area of the air exit, thereby ensuring reliable flow conditions.

Furthermore, according to the present invention, it is particularly easy to optimize the air exit flow aerodynamically and, if applicable, adapt it to the flight conditions, for example by outlet flaps or the like.

In order to ensure adequate de-icing also at low inflow velocities, for example during taxiing of an aircraft, it can be favorable if the air duct is additionally connectable to a supply line for compressor air (bleed air). The latter can preferably issue via a nozzle. This enables hot bleed air to be additionally supplied, if required.

The present invention is further advantageous in that use is made of the large heat quantity delivered by the oil cooler, for example 100 kW. Also, the air exiting from the oil cooler does not have very high temperatures, for example max. 120° C. Therefore, the overall structure is not affected in terms of material, enabling, in particular, the use of aluminium alloys which in these circumstances feature an almost unlimited service life. With the exclusive use of bleed air according to the state of the art, the temperature load is much higher, for example 10 times, resulting in considerable aging and material problems.

Another advantage according to the present invention is that the compactness of the engine nacelle according to the present invention enables the inflow area to be minimized, resulting in generally favorable flow conditions. Here, it is advantageous if the oil cooler is arranged essentially at the top of the engine nacelle and/or, at a location set back in flow direction from the inlet plane of the engine, a cooling-air inlet for the oil cooler is arranged on the surface of the engine nacelle.

Accordingly, the present invention also provides a solution for a de-icing device usable at another location of the aircraft, for example for the de-icing of pylons or wings. Here again, the cooling air exiting from at least one oil cooler can be used for heating the respective component and, thus, for de-icing.

The present invention is more fully described in light of the accompanying drawings, showing a preferred embodiment. In the drawings, FIG. 1 is a schematic simplified axial sectional view of an engine nacelle of a turboprop engine, FIG. 2 is an enlarged representation of detail C as per FIG. 1, and FIG. 3 is an enlarged representation of detail D as per FIG. 1.

According to the present invention, a conventionally designed engine nacelle 1 is provided in which a conventionally designed aircraft gas turbine 6 is arranged. The engine nacelle 1 is provided on its inflow area (from left according to FIG. 1) with a closed, annular air duct 2 connecting to an upper inflow duct 7 (see FIG. 2). Accordingly, the airflow passes via the inflow duct 7 into the annular air duct 2 and leaves the latter through a bottom efflux duct 8 which can be convergent and terminates in an outlet 9 (see FIG. 3). The outlet 9 can additionally be variable for flow optimization, for example by means of flaps.

Figure 2:
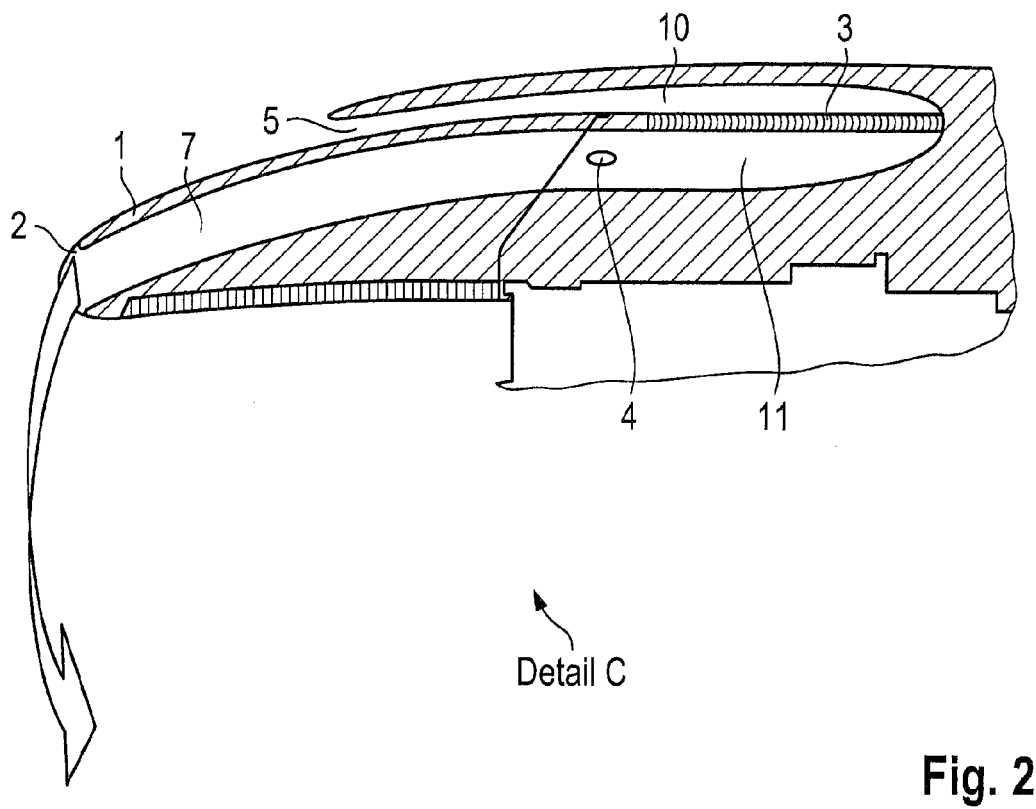
Figure 3:
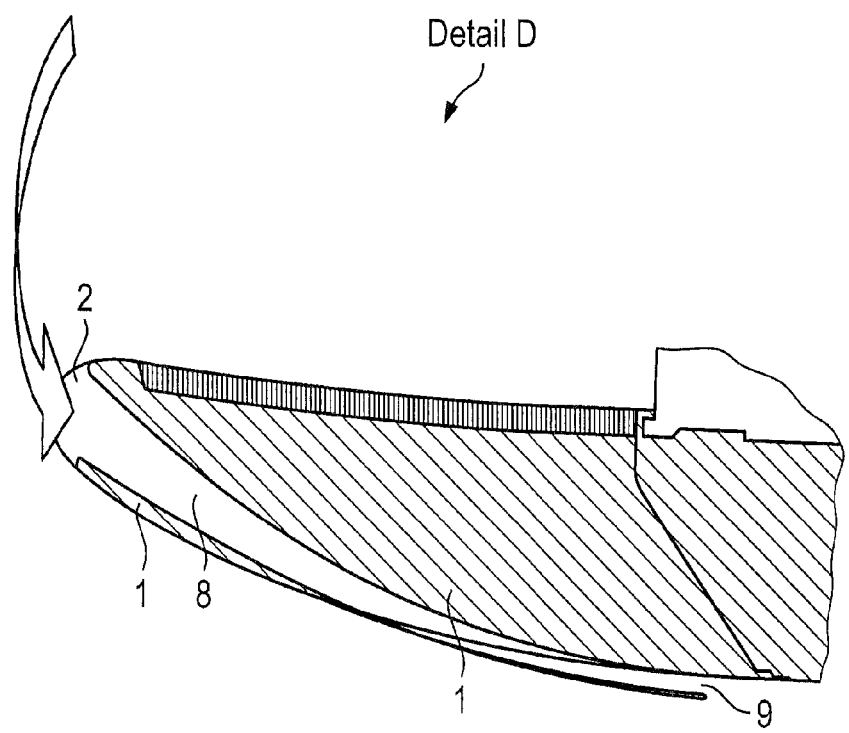

As illustrated in FIG. 2, an oil cooler 3 through which hot engine oil is passed is arranged in flow direction in the inlet area of the inflow duct 7. Ambient air is fed via a cooling-air inlet 5 situated at the top of the engine nacelle 1 into an afflux duct 10 and subsequently to the oil cooler 3. The afflux duct 10 may be designed as a diffuser. The inflow duct 7 may be designed as a convergent duct 11 behind the exit of the oil cooler 3.

Furthermore, a nozzle 4 is provided in the area of the inflow duct 7 via which bleed air from the high-pressure compressor may additionally be supplied at low speed of the aircraft, for example during taxiing.

Therefore, according to the present invention, a large volume of air with relatively low temperature passes the annular air duct 2. This is in contrast with the solutions of the state of the art in which a small volume of bleed air with relatively high temperature is passed through the annular duct 2. Therefore, the reduced temperature loading obtained according to the present invention provides for a substantial increase in service life of the components.

List of Reference Numerals
1 Engine nacelle
2 Annular air duct
3 Oil cooler
4 Nozzle
5 Cooling-air inlet
6 Aircraft gas turbine
7 Inflow duct
8 Efflux duct
9 Outlet
10 Afflux duct
11 Convergent duct

What is claimed is:

1. An engine nacelle of an aircraft gas turbine having a de-icing device, comprising:
   an annular air duct, positioned in an inlet lip of an inflow area of the engine nacelle and extending circumferentially around the inlet lip, into which heated air is introduced;
   at least one oil cooler positioned in the engine nacelle rearward of the annular air duct, to which engine oil is fed and which is supplied with ambient air to be heated by the oil cooler;
   an inflow duct flowingly positioned between the oil cooler and the annular air duct for routing the heated air flow leaving the oil cooler to the annular air duct, to be routed circumferentially around the inlet lip through the annular air duct;
   an air efflux duct positioned rearward and downstream of the annular air duct for exhausting the heated air flow that has passed through the annular air duct and warmed the inlet lip;
   the annular air duct being closed between the inflow duct and the air efflux duct.

2. The engine nacelle of claim 1, wherein the annular air duct is connectable to a supply line for compressor air.

3. The engine nacelle of claim 2, wherein the supply line issues into a nozzle positioned to inject air from the compressor into the annular air duct.

4. The engine nacelle of claim 3, wherein the oil cooler is positioned essentially at a top of the engine nacelle.

5. The engine nacelle of claim 4, and further comprising a cooling-air inlet for the oil cooler positioned on a surface of the engine nacelle at a location set back in flow direction from an inlet plane of the engine.

6. The engine nacelle of claim 5, wherein the air efflux duct includes a flow-optimizing mechanism.

7. The engine nacelle of claim 6, wherein the flow-optimizing mechanism is a variable flow outlet.

8. The engine nacelle of claim 7, wherein the inflow duct and air efflux duct are positioned circumferentially opposite one another on the engine nacelle and all heated air flow passing through the oil cooler is routed to the annular air duct through the inflow duct to pass circumferentially around an entirety of a circumference of the inlet lip through the annular air duct before exiting the engine nacelle via the air efflux duct.

9. The engine nacelle of claim 8, wherein the air efflux duct exhausts the heated air flow to an exterior of the engine.

10. The engine nacelle of claim 1, wherein the oil cooler is positioned essentially at a top of the engine nacelle.

11. The engine nacelle of claim 10, and further comprising a cooling-air inlet for the oil cooler positioned on a surface of the engine nacelle at a location set back in flow direction from an inlet plane of the engine.

12. The engine nacelle of claim 11, wherein the air efflux duct includes a flow-optimizing mechanism.

13. The engine nacelle of claim 12, wherein the flow-optimizing mechanism is a variable flow outlet.

14. The engine nacelle of claim 1, wherein the inflow duct and air efflux duct are positioned circumferentially opposite one another on the engine nacelle and all heated air flow passing through the oil cooler is routed to the annular air duct through the inflow duct to pass circumferentially around an entirety of a circumference of the inlet lip through the annular air duct before exiting the engine nacelle via the air efflux duct.

15. The engine nacelle of claim 14, wherein the air efflux duct exhausts the heated air flow to an exterior of the engine.

16. An aircraft de-icing system, comprising:
    an annular air duct, positioned in an inlet lip of an inflow area of an engine nacelle of the aircraft and extending circumferentially around the inlet lip, into which heated air is introduced;
    an oil cooler which is supplied heated oil from a heat generating system of the aircraft, the at least one oil cooler positioned in the engine nacelle rearward of the annular air duct;
    an air routing system for supplying ambient air to the oil cooler to be heated by the oil cooler;
    a heated air routing system for routing heated air leaving the oil cooler to the annular air duct, the heated air routing system including an inflow duct flowingly positioned between the oil cooler and the annular air duct for routing the heated air flow leaving the oil cooler to the annular air duct, to be routed circumferentially around the inlet lip through the annular air duct;
    an air efflux duct positioned rearward and downstream of the annular air duct for exhausting the heated air flow that has passed through the annular air duct and warmed the inlet lip;
    the annular air duct being closed between the inflow duct and the air efflux duct.

17. The aircraft de-icing system of claim 16, wherein the heated air routing system routes the heated air leaving the oil cooler to at least one wing leading edge of the aircraft.

18. The aircraft de-icing system of claim 17, wherein the heated air routing system routes the heated air leaving the oil cooler to at least one engine suspension pylon of the aircraft.

19. The aircraft de-icing system of claim 16, wherein the heated air routing system routes the heated air leaving the oil cooler to at least one engine suspension pylon of the aircraft.

\* \* \* \* \*